United States Patent [19]
DeSimone et al.

[11] Patent Number: 6,025,459
[45] Date of Patent: Feb. 15, 2000

[54] SYNTHESIS OF POLYAMIDES IN LIQUID AND SUPERCRITICAL $CO_2$

[75] Inventors: Joseph DeSimone, Chapel Hill; Ramone Givens, Raleigh; Yizeng Ni, Chapel Hill, all of N.C.

[73] Assignee: The University of North Carolina at Chapel Hill, Chapel Hill, N.C.

[21] Appl. No.: 08/800,286

[22] Filed: Feb. 12, 1997

[51] Int. Cl.[7] .................................................. C08G 69/00
[52] U.S. Cl. ......................... 528/312; 528/310; 528/322; 528/323; 528/335; 528/336; 528/480; 528/481; 528/483; 528/502 C
[58] Field of Search .................................. 528/312, 323, 528/335, 336, 480, 481, 483, 502 C

[56] References Cited

U.S. PATENT DOCUMENTS

| | | | |
|---|---|---|---|
| 4,362,852 | 12/1982 | Pendlebury et al. | 525/437 |
| 4,380,623 | 4/1983 | Greene et al. | 528/335 |
| 4,554,345 | 11/1985 | Greene et al. | 528/336 |
| 5,169,582 | 12/1992 | Illing | 264/141 |
| 5,218,080 | 6/1993 | Dellinger | 528/481 |
| 5,780,565 | 7/1998 | Clough et al. | 526/206 |

FOREIGN PATENT DOCUMENTS

| | | |
|---|---|---|
| 0 204 123 A1 | 10/1996 | European Pat. Off. . |
| WO 95/24438 | 3/1995 | WIPO . |
| PCT/US98/02595 | 2/1998 | WIPO . |

OTHER PUBLICATIONS

Clifford et al. *Chemical Reactions in Supercritical Fluids,* Chemistry and Industry, No. 12, pp. 449–452 (1996).

Romack et al., *Synthesis of Tetrafluoroethylene–based, Non-aqueous Fluoropolymers in Supercritical Carbon Dioxide,* Macromolecules, vol. 28, No. 24 (1995).

Givens et al., *Synthesis of Polyamides and Polycarbonates using Supercritical* $CO_2$, Polymer Preprints, American Chemical Society; Div. Polym. Chem., vol. 38, No. 2, pp. 468–469 (1997).

Abstract, XP–002069866, Database WPI, Section Ch., Week 7831, Derwent Publications Ltd. (1978).

*Primary Examiner*—P. Hampton-Hightower
*Attorney, Agent, or Firm*—Myers Bigel Sibley & Sajovec, P.A.

[57] ABSTRACT

A method of forming a polyamide from a corresponding nylon salt material comprises providing a reaction mixture comprising a nylon salt and carbon dioxide; and then condensing the nylon salt in the carbon dioxide to form a polyamide and water. A method of forming a polyamide comprises providing a reaction mixture containing at least one lactam monomer and carbon dioxide; and then polymerizing the lactam monomer in the carbon dioxide to form a polyamide.

37 Claims, 5 Drawing Sheets

Thermal Analysis of Nylon 6 Made in SC $CO_2$

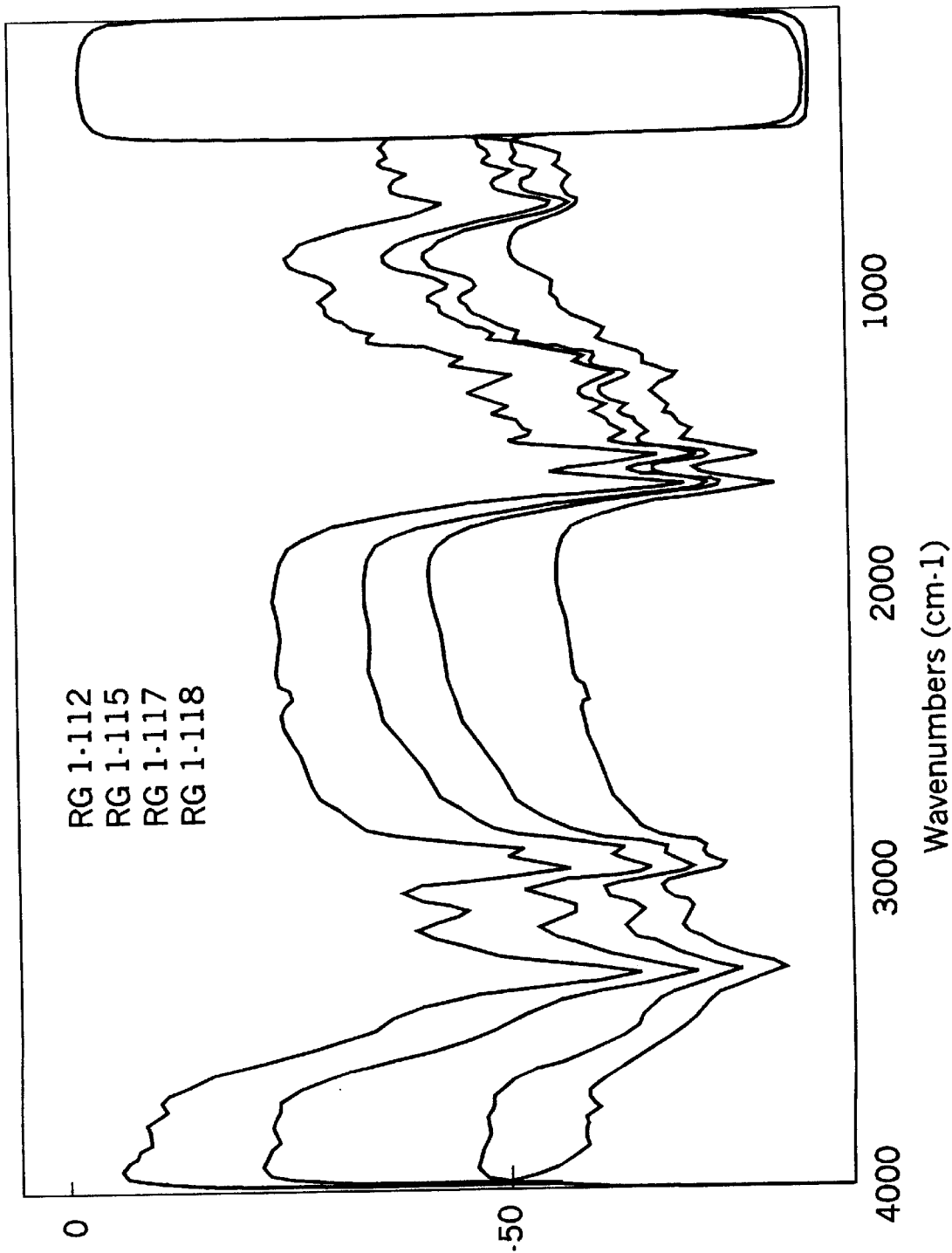

SYNTHESIS OF POLYAMIDES IN LIQUID AND SUPERCRITICAL $CO_2$

FIELD OF THE INVENTION

The present invention relates to the synthesis of polyamides in gaseous, liquid, or supercritical medium.

BACKGROUND OF THE INVENTION

Polyamides are compounds that have a wide variety of commercially significant end uses. As an example, the polymers are typically formed into fibers which may be used in materials exhibiting high tensile strength and modulus. Common polyamides include, for example, nylon 6 and nylon 6,6. These specific polyamides are especially advantageous when used in fibers employed in apparel, tire cords, and engineering resins.

Polyamides are commonly formed by various types of reaction schemes. A commercially popular reaction scheme is one involving melt polycondensation. In a melt polycondensation reaction, a diamine and a diacid are typically combined to form a salt, often referred to as a nylon salt. The nylon salt is then heated and the water is driven off. By controlling the efficiency of water removal, the molecular weight of the resulting polyamide can be managed.

In spite of the widespread commercial acceptance of the melt polycondensation reaction, a need in the art remains for a process which is more efficient. In particular, it would be advantageous to have a polyamide synthesis reaction which utilizes lower temperatures and shorter reaction times. Moreover, it would be desirable to conduct the reaction in a medium which is potentially more environmentally acceptable than a medium comprising an aqueous solution and organic solvents.

It is therefore an object of the present invention to provide a method of forming polyamides which uses a more potentially acceptable environmental reaction medium, along with lower temperatures and shorter reaction times.

SUMMARY OF THE INVENTION

In one aspect, the present invention relates to a method of forming a polyamide from a corresponding nylon salt material. The method comprises providing a reaction mixture comprising a nylon salt and carbon dioxide. Subsequently, the nylon salt is condensed in the carbon dioxide to form a polyamide and water. The carbon dioxide may be employed in the gaseous, liquid, or supercritical state. Preferred polyamides include nylon 6,6; nylon 6,10; nylon 6,12; and mixtures thereof.

In one embodiment, the method may further comprise the step of separating the polyamide from the reaction mixture following the condensation step. Subsequent to this step, the above method may further comprise the step of collecting the polyamide from the reaction mixture.

In another aspect, the invention relates to a method of forming a polyamide. The method comprises providing a reaction mixture containing at least one lactam monomer and carbon dioxide; and then polymerizing the lactam monomer in the carbon dioxide to form a polyamide. A preferred lactam monomer which is used in the above reaction is $\epsilon$-caprolactam. Preferred polyamides formed by the above method is nylon 6, nylon 11, nylon 12, and mixtures thereof.

BRIEF DESCRIPTION OF THE DRAWINGS

In the drawings which form a portion of the original disclosure of the invention:

FIG. 4 illustrates an infrared spectra of nylon 6 made in $CO_2$; and

DETAILED DESCRIPTION OF THE INVENTION

Figure 1A:
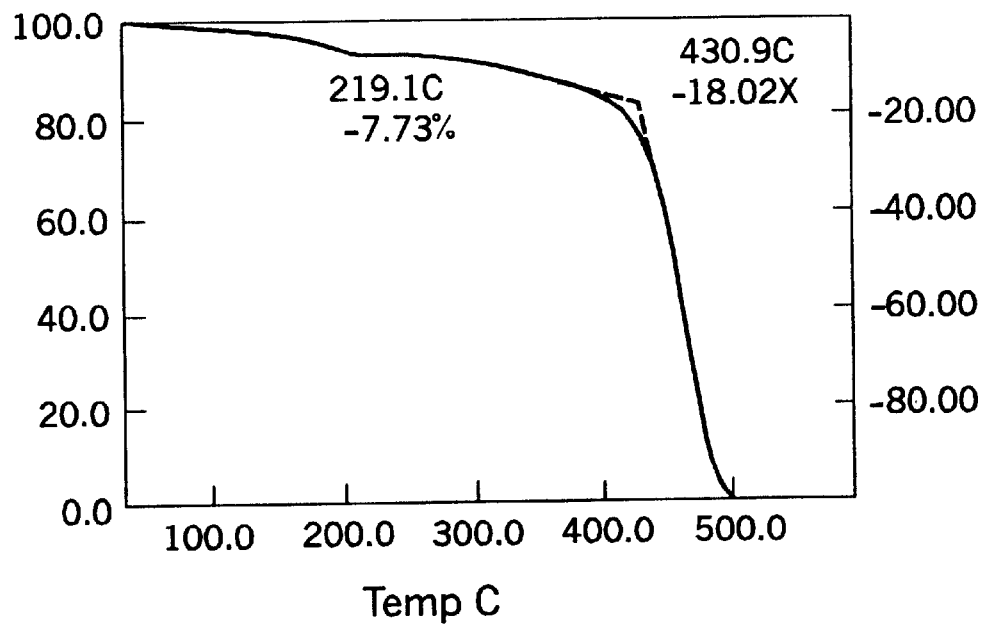
FIGS. 1a and 1b illustrate the thermal analysis of nylon 6 made in supercritical $CO_2$.
Figure 1B:
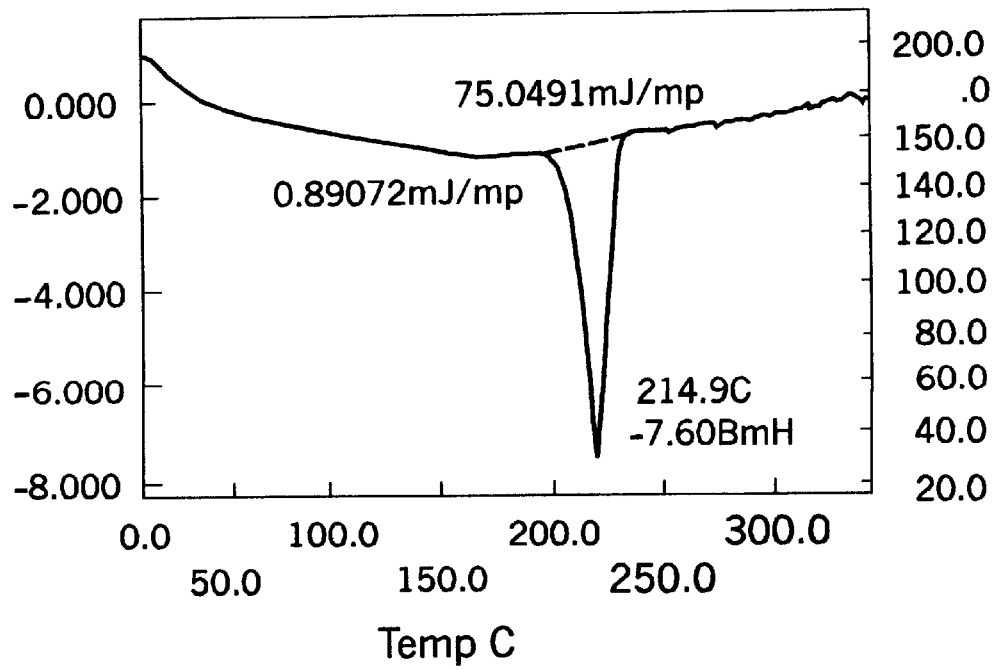
Figure 2:
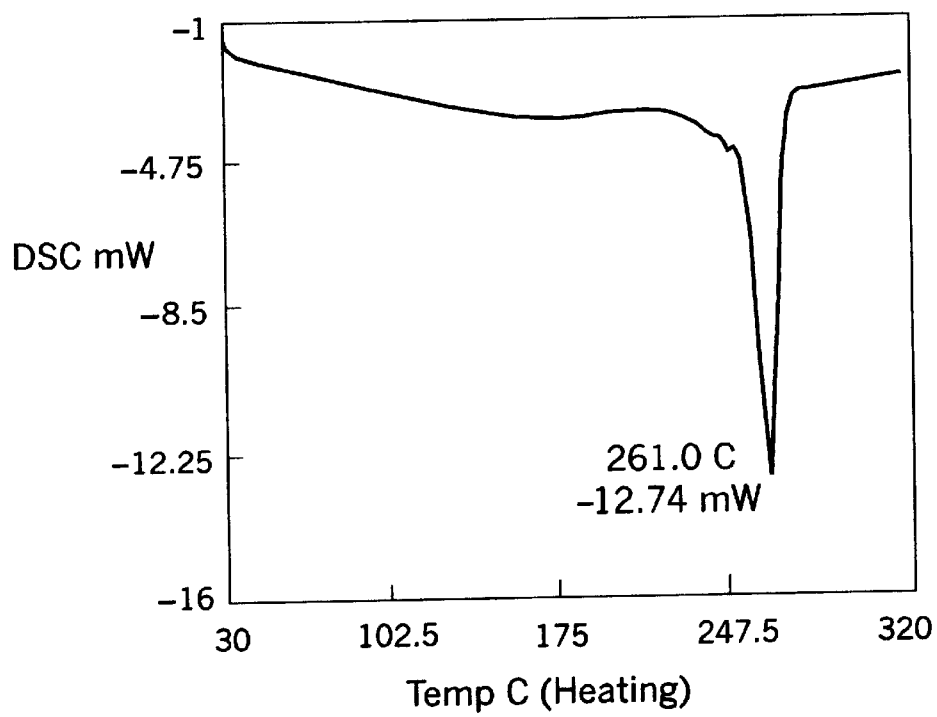
FIG. 2 illustrates a Differential Scan Calorimetry of nylon 6,6 made in supercritical $CO_2$.
Figure 3:
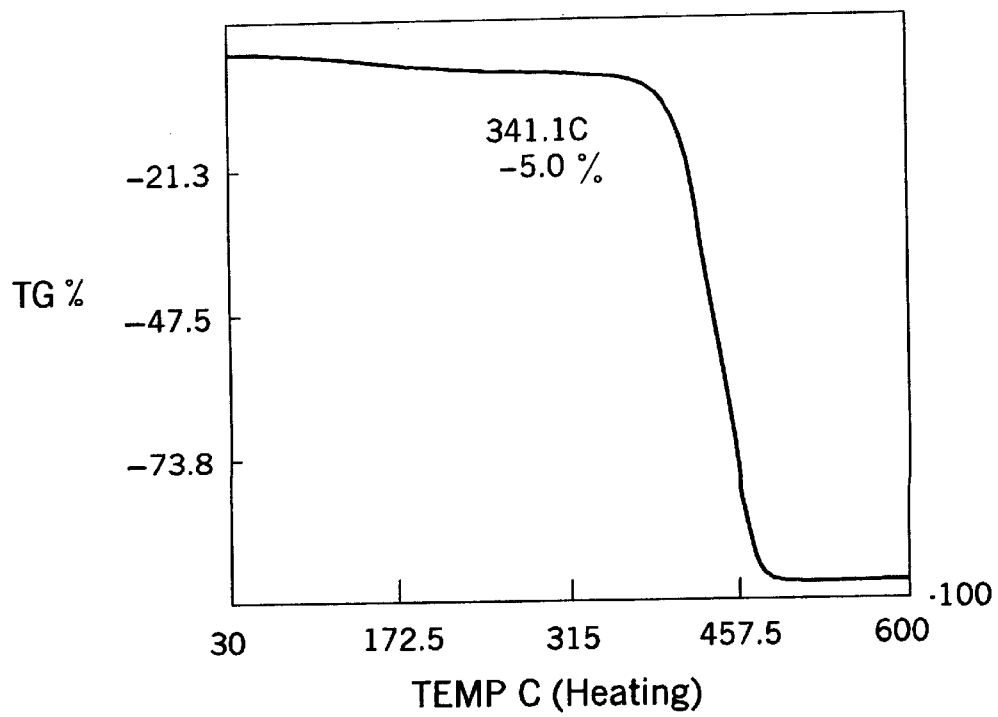
FIG. 3 illustrates a Thermal Gravimetric Analysis of nylon 6,6 made in supercritical $CO_2$.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

In one aspect, the present invention relates to a method of forming a polyamide from a corresponding nylon salt material. The method includes providing a reaction mixture comprising a nylon salt and carbon dioxide, and then condensing the nylon salt in the carbon dioxide to form a polyamide. Water is also formed by this reaction. This reaction is a melt polycondensation reaction.

In a second aspect, the present invention relates to a method of forming a polyamide. The method comprises providing a reaction mixture comprising at least one lactam monomer and carbon dioxide, and then polymerizing the lactam monomer in the reaction mixture to form a polyamide. This reaction is a ring opening polymerization reaction.

For the purposes of the invention, carbon dioxide is employed as a fluid in a reaction mixture in a liquid, gaseous, or supercritical phase. If liquid $CO_2$ is used, the temperature employed during the process is preferably below 31° C. If gaseous $CO_2$ is used, it is preferred that the phase be employed at high pressure. As used herein, the term "high pressure" generally refers to $CO_2$ having a pressure from about 20 to about 73 bar. In a preferred embodiment, the $CO_2$ is utilized in a "supercritical" phase. As used herein, "supercritical" means that a fluid medium is at a temperature that is sufficiently high that it cannot be liquified by pressure. The thermodynamic properties of $CO_2$ are reported in Hyatt, *J. Org. Chem.* 49: 5097–5101 (1984); therein, it is stated that the critical temperature of $CO_2$ is about 31° C. In particular, the methods of the present invention may be carried out at a temperature range which, at a low end may be about −31° C. or about −15° C., and at a high end may be about 275° C. or about 500° C. The pressures employed typically range from at a low end of about 200 psig or 500 psig to a high end of about 3000 psig or about 20,000 psig. For a melt condensation using a supercritical fluid extraction method, a typical pressure is above the critical point of $CO_2$, namely 73 atm.

The nylon salt used in the method is typically formed from monomers which are known in the art for producing such materials. These monomers include, but are not limited to, adipic acid; sebacic acid; 1,4-tetramethylene diamine;

1,6-hexamethylene diamine; dodecanedioic acid; and oxalic acid. Mixtures of any of the above may be used.

Lactam monomers which are to be used in the method of forming a polyamide include all of those which are known and suitable to one skilled in the art. A lactam is generally known as a cyclic amide produced from amino acids by the removal of one molecule of water (See e.g., *Hawley's Chemical Dictionary*, 12th ed., p. 679 (1993)). Lactam monomers which may be used in the method include, but are not limited to, caprolactam (i.e., $\epsilon$-caprolactam), $\omega$-enantholactam, capryllactam, $\omega$-aminoundecanoic, $\omega$-dodecanolactam, $\alpha$-piperidone, and mixtures thereof. Lactams which are used in the present invention may be made according to known synthesis techniques. For example, the lactams may be produced by anionic catalysis.

The term "polyamide" used herein is to be construed as having its conventional meaning in the art. For example, see "Polyamides", H. Mark et al., *Encyclopedia of Polymer Science and Engineering*, 2nd ed., Vol. 11, (1985), pp. 315–409. In particular, polyamides are polymers which contain recurring amide groups as integral parts of the main polymer chain. These polymers may include, for example, linear homopolymers derived, whether actually or notionally, from the condensation of diamine and dibasic acids. As an example, AA/BB type polyamides may be encompassed with A representing amine groups and B representing carboxyl groups. Exemplary polyamides condensed from nylon salts include, but are not limited to, nylon 6,6; nylon 6,10; nylon 6,12; and mixtures thereof. Polyamides which are formed via a ring opening reaction in the carbon dioxide fluid include, but are not limited to, nylon 6, nylon 11, nylon 12, and mixtures thereof.

Various additives may be used in the reaction mixtures employed in the methods of the present invention. Additional components may be used in the reaction mixture when synthesizing the polyamides. For example, reagents may be employed in appropriate amounts to limit the molecular weight of the resulting polyamide or to control its functionality. The reagents may also be added to vary the reaction times, alter the flow characteristics of the fluid employed (e.g., a supercritical fluid), or alter the use of a monofunctional monomer which would end cap the polymer chain. Exemplary reagents include, but are not limited to, monocarboxylic acids such as acetic acid; and monomamines such as butylamine. Cosolvents may also be added which include, but are not limited to, methylethylketone, ethane, propane, butane, and the like. Mixtures may also be employed.

The methods of the present invention can be carried out using known equipment. For example, the melt polycondensation and ring opening reactions can be carried out continuously or batch wise in appropriately designed high pressure reaction vessels or cells. Additional features may be employed such as agitation devices (e.g., a paddle stirrer or impeller stirrer) and heaters (e.g., a heating furnace or heating rods).

With respect to the melt polycondensation method, the nylon salt is formed typically from adipic acid and hexamethylene diamine using conventional techniques. One suitable technique involves reacting hexamethylene diamine and adipic acid in the presence of methanol to form the nylon salt. Other acid compounds which may be used to form other nylon salts (e.g., nylon 6,10) include, for example, sebacic acid. The melt polycondensation is then carried out in accordance with the method of the invention. The reaction is preferably carried out at a temperature ranging from about 100° C. to about 500° C. for a period of time ranging from about 0.2 to about 24 hours at a pressure of about 200 to about 10,000 psig. In a preferred embodiment, the resulting polyamide is then separated from the reaction mixture. The separation step may be carried out according to known and accepted techniques such as by temperature and pressure profiling, or melt extrusion from the reactor. Subsequently, the water which is present in the reaction vessel which is employed may be separated from the reaction mixture using known methods. With respect to the ring opening reaction, $\epsilon$-caprolactam is charged to the reactor along with, if desired, water or any other suitable component which may be used as a catalyst. The reaction is preferably carried out at a temperature ranging from about 250° C. to about 275° C. for a period of time ranging from about 2 to about 16 hours at a pressure of about 2000 to about 3500 psig.

The invention also relates to a method of purifying a polyamide. The method comprises providing a polyamide containing a contaminant and then removing the contaminant from the polyamide to purify the polyamide. The term "contaminant" refers to any type of material which may be present in a polyamide which may be desirable to remove from the polyamide. Preferably, the contaminant is a low molecular weight contaminant, namely a contaminant having a weight average molecular weight ranging preferably from about 18 to about 565. Examples of such contaminants include $\epsilon$-caprolactam, water, a reagent, and higher cyclics such as cyclic dimer, cyclic trimer, cyclic tetramer, cyclic pentamer, and the like. Mixtures thereof may also be removed. The purity of the polyamide treated by this method preferably ranges from about 95 percent to about 100 percent, and more preferably from about 99 percent to about 100 percent.

The polyamides produced in accordance with the invention are highly useful. For example, the polyamides may be used as fibers, bristles, bearings, gears, molded objects, coatings, and adhesives. In general, the polyamides are particularly well suited for any application which requires strength and toughness properties.

The following examples are to be interpreted as illustrative of the present invention, and are not construed as limiting thereof. In the examples, hexamethyl diamine (98 percent), $\epsilon$-caprolactam (99 percent), and adipic acid (99 percent) were supplied by Aldrich and used as received. HPLC water and carbon dioxide (SCF/SCE grade with a helium head pressure) was provided by Air Products and Chemicals.

Example 1

Synthesis of Nylon 6,6

A 1000 ml two neck round bottom flask was charged with 300 mL of degassed methanol and hexamethylene diamine (30.00 g, 0.258 mol). To this solution was added adipic acid (37.73 g, 0.258 mol). The solution was heated at reflux for 60 min under an argon atmosphere. A white solid salt precipitated out immediately. The white material was collected and dried under vacuum.

EXAMPLES 2–6

Polycondensation Reactions

Examples 2 through 6 illustrate polycondensation reactions conducted in carbon dioxide employing the material synthesized in Example 1.

EXAMPLE 2

A 25 mL stainless steel reactor cell having a magnetic stir bar was charged with 2.00 g of nylon 6,6 salt prepared in Example 1. The cell was pressurized to an initial pressure of 900 psig of $CO_2$. The cell was heated to 180° C. for 120 min. The cell was then cooled to room temperature and a white solid of nylon 6,6 remained. The yield was 94.9 percent, Mn=4000k. It was observed that one could depress the normal melting point of the nylon salt upon exposure to carbon dioxide allowing polymerization to occur at a lower temperature than without carbon dioxide (see Table 4).

EXAMPLE 3

To the reactor cell used in Example 1 was added 2.00 g of nylon 6,6 salt prepared in Example 1. The cell was purged with argon for 30 minutes. An initial pressure of 860 psig was obtained and heating began to a final temperature of 180° C. and a final pressure of 3100 psig. The reaction was carried out overnight. A white solid nylon 6,6 polymer was formed with a 93.7 percent yield and an Mn=6000 k.

EXAMPLE 4

30.00 g of nylon 6,6 salt was added to a 100 ml autoclave reactor cell. $CO_2$ at 250° C. was introduced to the cell until an initial pressure of 1000 psi was reached. At 150° C., stirring was started at 50 rpm and a continuous flow process was conducted at a rate of 1 ml per minute. After 30 minutes at 250° C., the flow was increased to 2 ml per minute while an internal pressure of 3000 to 3500 psig was maintained. These conditions continued until a final reaction time of 60 minutes between 260° C. and 285° C. was achieved. After cooling, the opaque solid was collected and dried under vacuum for 24 hours. The yield was 95.3 percent and Mn=4000k.

EXAMPLE 5

The autoclave reactor cell described in Example 4 was charged with 20.00 g of nylon 6,6 salt with the cell being purged with argon for 30 minutes. $CO_2$ (250° C.) was introduced to the cell until an initial pressure of 1050 psig was reached. The reactor was heated and stirred at an initial temperature of 150° C. and 500 rpm. A continuous flow of $CO_2$ was maintained, and an internal cell pressure between 3000 and 3500 psig was observed. The reaction was agitated at 220° C. for 120 minutes, and the cell was then heated to between 270° C. and 285° C., under which conditions the cell was maintained for an additional 120 minutes. The yield was 89.2 percent with Mn 12,200k.

EXAMPLE 6

The autoclave reactor cell described in Example 4 was charged with 20.00 g of nylon 6 ,6 salt and the cell was purged with argon for 30 minutes. $CO_2$ was introduced into the cell at a temperature of 250° C. until an initial pressure of 1500 psig was obtained. The reactor was heated from a temperature of 150° C. and stirred at 500 rpm. A continuous flow of $CO_2$ at 2 ml/min was maintained at a pressure ranging between 3000 and 3500 psig. The reaction was stirred at 220° C. for 120 minutes at a temperature ranging between 270° C. and 285° C. for an additional 180 minutes. The yield was 88.7 percent with a Mn=24,500k.

EXAMPLES 7–12

Ring Opening Synthesis Reactions

Examples 7 through 12 illustrate ring opening synthesis reactions.

EXAMPLE 7

A 25 ml stainless steel reactor cell was charged with 2.00 g of ε-caprolactam and 30 percent excess molar equivalents of water. The reactor was then purged with argon for 20 minutes. Carbon dioxide was introduced to the cell until a final pressure of 900 psig was obtained. The reactor was heated to 180° C. for 24 hours. The resulting polymer was filtered and washed with acetone and dried under vacuum for 8 hours.

EXAMPLE 8

The reactor cell described in Example 7 was charged with 2.00 g of ε-caprolactam and 30 excess molar equivalents of water. The reactor was then purged with argon for 20 minutes. Carbon dioxide was then added to a final pressure of 900 psig. The reactor was then heated to 250° C. for 4 hours. The polymer was filtered and washed with acetone and dried under vacuum for 8 hours.

EXAMPLE 9

The reactor cell described in Example 7 was charged with 2.00 g of ε-caprolactam and 30 percent excess molar equivalents of water. The reactor was then purged with argon for 20 minutes. Carbon dioxide was then added to a final pressure of 900 psig. The reactor was heated to 250° C. for 7 hours. The resulting polymer was filtered and washed with acetone and dried under vacuum for 8 hours.

EXAMPLE 10

The reactor cell described in Example 7 was charged with 2.00 g of ε-caprolactam and 63 percent molar equivalents of water. The reactor was then purged with argon for 20 minutes. Carbon dioxide was then added to a final pressure of 900 psig. The reactor was heated to 250° C. for 14 hours. The polymer was then filtered and washed with acetone and dried under vacuum for 8 hours.

EXAMPLE 11

The reactor cell described in Example 7 was charged with 2.00 g of ε-caprolactam and 0 percent excess molar equivalents of water. The reactor was then purged with argon for 20 minutes. Carbon dioxide was then added to a final pressure of 900 psig. The reactor was heated to 250° C. for 14 hours. The polymer was filtered and washed with acetone, and then dried under vacuum for 8 hours.

EXAMPLE 12

Figure 5A:
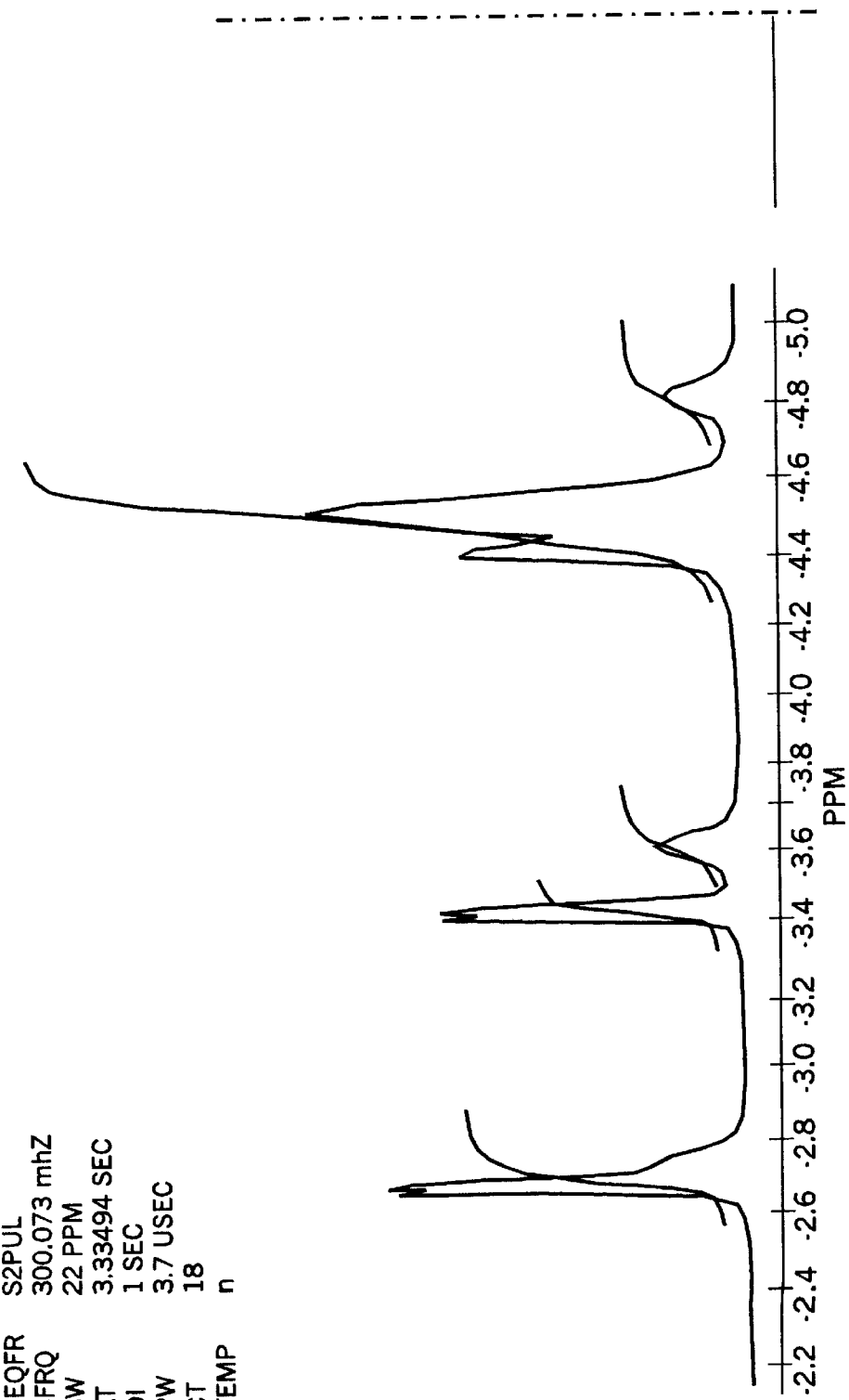
FIG. 5 illustrates an NMR analysis of nylon 6 extracted with $CO_2$ showing the removal of residual monomer.
Figures 5, 5B:
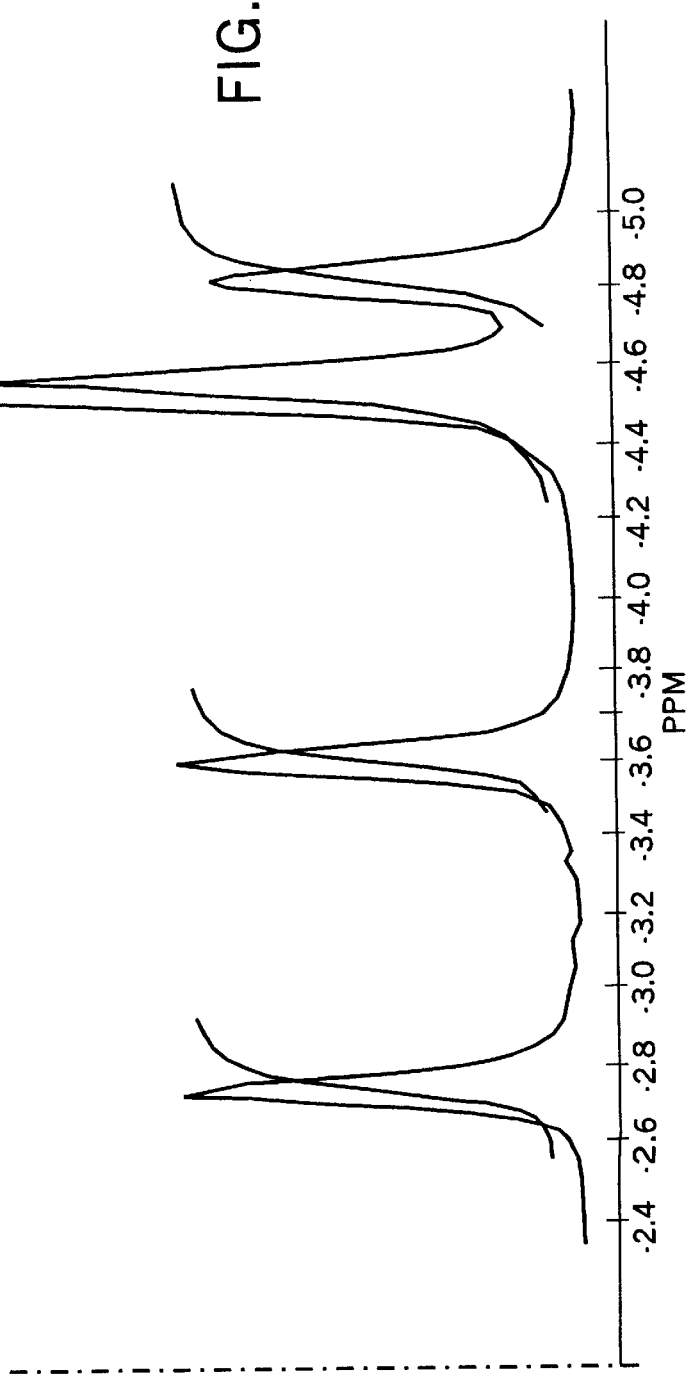

A nylon 6 sample of 25,000 g/mol which contained unreacted cyclics (ε-caprolactam monomer and higher cyclics) was extracted using $CO_2$ to remove the cyclics and purify the polymer. FIG. 5 shows the NMR spectrum of the sample before and after extraction with $CO_2$ at 60° C. and 3000 psig.

Tables 1–4 generally illustrate conditions employed for the synthesis of nylon 6 and nylon 6,6, as well as solubility data for hexamethylene diamine, adipic acid, and ε-caprolactam.

TABLE 1

| | Solubility of Related Compounds | | | |
|---|---|---|---|---|
| Compound | Temperature (° C.) | Pressure (psi) | Solubility | wt(g)/vol(ml) |
| Hexamethylene Diamine | — | — | Reactive | — |

TABLE 1-continued

Solubility of Related Compounds

| Compound | Temperature (° C.) | Pressure (psi) | Solubility | wt(g)/vol(ml) |
|---|---|---|---|---|
| Adipic Acid | 150° C. | 5000 | No | 2.0/25 |
| ε-Caprolactam | rt. | 2000 | Yes | 2.0/25 |

* The related chemicals for the nylon 6,6 polymer need not be soluble in $CO_2$ but ε-caprolactam is soluble is at ambient temperatures and pressures

TABLE 2

Nylon 6,6 Synthesis Data

| Pressure, Temperature | Temperature, Time | Mn | % Yield |
|---|---|---|---|
| 900, rt. | 180° C., 2 hr | 4000 | 95 |
| 900, rt. | 180° C., 24 hr | 6500 | 94 |
| 1500, 15° C. | 260–285° C., 2 hr | 4000 | 95 |
| 1100, 150° C. | 220° C., 2 hr 275–285° C., 2 hr | 12,200 | 90 |
| 1500, 150° C. | 220° C., 2 hr 275–285° C., 3 hr | 24,500 | 90 |

TABLE 3

Nylon 6 Synthesis Data

| Pressure (psi) | Molar equivalence Water Added | Temperature Time | Mw | % Yield |
|---|---|---|---|---|
| 900 | 30% excess | 180° C., 24 hr | 6200 | 91 |
| 900 | 30% excess | 250° C., 4 hr | 7100 | 95 |
| 900 | 30% excess | 250° C., 7 hr | 8500 | 95 |
| 900 | 63% | 250° C., 24 hr | 6600 | 93 |
| 900 | 0% | 250° C., 24 hr | 25000 | 95 |

TABLE 4

Plasticization Effect

| Salt | Tm | Pressure |
|---|---|---|
| Nylon 6,6 | 195° C. | 1 atm air |
| Nylon 6,6 | 150° C. | 250 atm $CO_2$ |

* Carbon Dioxide plasticization of the melting temperature was observed

In the specification and examples, there have been disclosed typical preferred embodiments of the invention and, although specific terms are employed, they are used in a generic and descriptive sense only and not for purposes of limitation of the scope of the invention being set forth in the following claims.

That which is claimed is:

1. A method of forming a polyamide from a corresponding nylon salt material, said method comprising:
   condensing a nylon salt present in carbon dioxide to form a polyamide, and wherein water is formed as a result of said condensation step.

2. The method according to claim 1, wherein said carbon dioxide is gaseous carbon dioxide.

3. The method according to claim 1, wherein said nylon salt is formed from monomers selected from the group consisting of adipic acid; sebacic acid; 1,4-tetramethylene diamine; 1,6-hexamethylene diamine; dodecanedioic acid; oxalic acid; and mixtures thereof.

4. The method according to claim 1, wherein polyamide is selected from the group consisting of nylon 6,6; nylon 6,10; nylon 6,12; and mixtures thereof.

5. A method of forming a polyamide, said method comprising:
   polymerizing at least one lactam monomer present in carbon dioxide to form a polyamide.

6. The method according to claim 5, wherein said carbon dioxide is gaseous carbon dioxide.

7. The method according to claim 5, wherein said polyamide is selected from the group consisting of nylon 6, nylon 11, nylon 12, and mixtures thereof.

8. The method according to claim 5, wherein said reaction mixture further comprises a reagent.

9. A method of forming a polyamide from a corresponding nylon salt, said method comprising:
   condensing a nylon salt in liquid carbon dioxide to form a polyamide and water, wherein said nylon salt and said liquid carbon dioxide together comprise a reaction mixture.

10. The method according to claim 9, wherein said nylon salt is formed from monomers selected from the group consisting of adipic acid; sebacic acid; 1,4-tetramethylene diamine; 1,6-hexamethylene diamine; dodecanedioic acid; oxalic acid; and mixtures thereof.

11. The method according to claim 9, wherein said polyamide is selected from the group consisting of nylon 6,6; nylon 6,10; nylon 6,12; and mixtures thereof.

12. A method of forming a polyamide from a corresponding nylon salt, said method comprising:
   condensing a nylon salt in supercritical carbon dioxide to form a polyamide and water, wherein said nylon salt and said supercritical carbon dioxide together comprise a reaction mixture.

13. The method according to claim 12, wherein said nylon salt is formed from monomers selected from the group consisting of adipic acid; sebacic acid; 1,4-tetramethylene diamine; 1,6-hexamethylene diamine; dodecanedioic acid; oxalic acid; and mixtures thereof.

14. The method according to claim 12, wherein said polyamide is selected from the group consisting of nylon 6,6; nylon 6,10; nylon 6,12; and mixtures thereof.

15. A method of forming a polyamide from a corresponding nylon salt material, said method comprising:
   condensing a nylon salt in carbon dioxide to form a polyamide and water,
   wherein said nylon salt and said carbon dioxide together comprise a reaction mixture, said reaction mixture further comprising a reagent.

16. The method according to claim 15, wherein said nylon salt is formed from monomers selected from the group consisting of adipic acid; sebacic acid; 1,4-tetramethylene diamine; 1,6-hexamethylene diamine; dodecanedioic acid; oxalic acid; and mixtures thereof.

17. The method according to claim 15, wherein said polyamide is selected from the group consisting of nylon 6,6; nylon 6,10; nylon 6,12; and mixtures thereof.

18. A method of forming a polyamide from a corresponding nylon salt material, said method comprising:
   condensing a nylon salt in carbon dioxide to form a polyamide and water, wherein said nylon salt and said carbon dioxide together comprise a reaction mixture; and
   separating said polyamide from said reaction mixture.

19. The method according to claim 18, further comprising the step of collecting said polyamide from said reaction mixture following said separating step.

20. The method according to claim 18, wherein said nylon salt is formed from monomers selected from the group consisting of adipic acid; sebacic acid; 1,4-tetramethylene diamine; 1,6-hexamethylene diamine; dodecanedioic acid; oxalic acid; and mixtures thereof.

21. The method according to claim 18, wherein said polyamide is selected from the group consisting of nylon 6,6; nylon 6,10; nylon 6,12; and mixtures thereof.

22. A method of forming a polyamide from a corresponding nylon salt material, said method comprising:

condensing a nylon salt in carbon dioxide to form a polyamide and water, wherein said nylon salt and said carbon dioxide together comprise a reaction mixture; and removing water from said reaction mixture.

23. The method according to claim 22, wherein said nylon salt is formed from monomers selected from the group consisting of adipic acid; sebacic acid; 1,4-tetramethylene diamine; 1,6-hexamethylene diamine; dodecanedioic acid; oxalic acid; and mixtures thereof.

24. The method according to claim 22, wherein said polyamide is selected from the group consisting of nylon 6,6; nylon 6,10; nylon 6,12; and mixtures thereof.

25. A method of forming a polyamide, said method comprising:

polymerizing at least one lactam monomer in carbon dioxide to form a polyamide, said at least one lactam polymer selected from the group consisting of $\epsilon$-caprolactam, $\omega$-enantholactam, capryllactam, $\omega$-aminoundecanoic, $\omega$-dodecanolactam, $\alpha$-piperidone, and mixtures thereof, wherein said at least one monomer and said carbon dioxide together comprise a reaction mixture.

26. The method according to claim 25, wherein said polyamide is selected from the group consisting of nylon 6, nylon 11, nylon 12, and mixtures thereof.

27. The method according to claim 25, wherein said reaction mixture further comprises water.

28. A method of forming a polyamide, said method comprising: polymerizing at least one lactam monomer in liquid carbon dioxide to form a polyamide, wherein said at least one lactam monomer and said liquid carbon dioxide together comprise a reaction mixture.

29. The method according to claim 28, wherein said at least one lactam monomer is selected from the group consisting of $\epsilon$-caprolactam, $\omega$-enantholactam, capryllactam, $\omega$-aminoundecanoic, $\omega$-dodecanolactam, $\alpha$-piperidone, and mixtures thereof.

30. The method according to claim 28, wherein said polyamide is selected from the group consisting of nylon 6, nylon 11, nylon 12, and mixtures thereof.

31. The method according to claim 28, wherein said polyamide precipitates into a solid material, and further comprising the step of isolating said polyamide from said reaction mixture.

32. A method of forming a polyamide, said method comprising:

polymerizing at least one lactam monomer in supercritical carbon dioxide to form a polyamide, wherein said at least one lactam monomer and said supercritical carbon dioxide together comprise a reaction mixture.

33. The method according to claim 32, wherein said at least one lactam monomer is selected from the group consisting of $\epsilon$-caprolactam, $\omega$-enantholactam, capryllactam, $\omega$-aminoundecanoic, $\omega$-dodecanolactam, $\alpha$-piperidone, and mixtures thereof.

34. The method according to claim 32, wherein said polyamide is selected from the group consisting of nylon 6, nylon 11, nylon 12, and mixtures thereof.

35. The method according to claim 32, wherein said polyamide precipitates into a solid material, and further comprising the step of isolating said polyamide from said reaction mixture.

36. A method for purifying a polyamide, said method comprising:

contacting a mixture comprising a polyamide and a contaminant with carbon dioxide at a pressure ranging from about 200 psig to about 20,000 psig to separate the contaminant from the mixture and purify the polyamide.

37. The method according to claim 36, wherein said contaminant is a low molecular weight contaminant selected from the group consisting of $\epsilon$-caprolactam, water, a reagent, cyclic dimer, cyclic trimer, cyclic tetramer, cyclic pentamer, and mixtures thereof.

* * * * *

UNITED STATES PATENT AND TRADEMARK OFFICE
CERTIFICATE OF CORRECTION

PATENT NO. : 6,025,459
DATED : February 15, 2000
INVENTOR(S) : DeSimone et al.

It is certified that error appears in the above-identified patent and that said Letters Patent is hereby corrected as shown below:

Title Page,
Section [75]; In Yizeng Ni's address, "Chapel Hill" should be -- Carrboro --.

Signed and Sealed this

Twenty-fifth Day of September, 2001

Attest:

*Nicholas P. Godici*

NICHOLAS P. GODICI
*Attesting Officer*   *Acting Director of the United States Patent and Trademark Office*